(12) United States Patent
Sawhney

(10) Patent No.: US 7,033,020 B2
(45) Date of Patent: Apr. 25, 2006

(54) COLLAPSIBLE EYEGLASSES

(75) Inventor: Ravi K. Sawhney, Calabasas, CA (US)

(73) Assignee: RKS Design International, Thousand Oaks, CA (US)

( * ) Notice: Subject to any disclaimer, the term of this patent is extended or adjusted under 35 U.S.C. 154(b) by 0 days.

(21) Appl. No.: 10/861,273

(22) Filed: Jun. 4, 2004

(65) Prior Publication Data

US 2004/0263775 A1 Dec. 30, 2004

Related U.S. Application Data

(60) Provisional application No. 60/476,355, filed on Jun. 6, 2003.

(51) Int. Cl.
G02C 5/08 (2006.01)

(52) U.S. Cl. ............................. 351/63; 2/254
(58) Field of Classification Search ................. 351/63, 351/41; 2/254
See application file for complete search history.

(56) References Cited

U.S. PATENT DOCUMENTS

| | | | |
|---|---|---|---|
| 4,549,792 A | 10/1985 | Dianitsch | |
| 4,834,523 A | 5/1989 | Porsche | |
| 4,887,896 A * | 12/1989 | Akagi | 351/63 |
| 5,528,320 A | 6/1996 | Specht et al. | |
| 5,532,766 A | 7/1996 | Mateer et al. | |
| 5,633,692 A | 5/1997 | Schleger et al. | |
| 5,818,569 A | 10/1998 | Berent | |
| 5,929,966 A | 7/1999 | Conner | |
| 6,048,062 A | 4/2000 | Chow | |
| RE37,640 E | 4/2002 | Conner | |
| 6,409,335 B1 | 6/2002 | Lipawsky | |
| 6,752,496 B1 | 6/2004 | Conner | |
| 6,783,236 B1 * | 8/2004 | Chou | 351/63 |
| 2004/0141148 A1 | 7/2004 | Chou | |

* cited by examiner

Primary Examiner—Hung Xuan Dang
(74) Attorney, Agent, or Firm—Fellers, Snider, et al.; Daniel P. Dooley

(57) ABSTRACT

A collapsible eyewear apparatus that at least includes: a lens supported by a lens support member; a lens shield member providing a protective shield for an entirety of the lens against inadvertent contact with foreign objects, said member comprising an accent aperture frame with an attachment portion engaging the lens support member; and an accent aperture formed by the accent aperture frame, offset from the attachment portion, and extending through a main body portion of the lens shield member is disclosed. In a preferred embodiment, the collapsible eyewear apparatus further includes: an earpiece confinement portion distal from the attachment portion, wherein the main body portion is disposed between the attachment portion and the earpiece confinement portion; and an earpiece member interacting with the earpiece confinement portion, wherein the accent aperture is configured to accommodate the earpiece member in a coplanar relationship with the aperture frame.

20 Claims, 3 Drawing Sheets

US 7,033,020 B2

COLLAPSIBLE EYEGLASSES

CROSS REFERENCE TO RELATED APPLICATIONS

This application claims priority to U.S. Provisional Application No. 60/476,355 filed Jun. 6, 2003, entitled COLLAPSIBLE EYEGLASSES.

BACKGROUND OF THE INVENTION

This invention relates generally to the field of eyewear and more particularly, but not by way of limitation, to folding or collapsible eyewear. There are many folding eyeglasses on the market, some more clever, compact, or innovative than others. The most typical application is in magnifying or reading glasses for people who don't need to wear prescription eyeglasses, but need occasional help in reading fine print, while driving, and similar situations. Most such glasses fold up into a size compact enough to be placed in a shirt pocket.

Frequently, existing folding glasses function well, both optically and mechanically, most are in need of a case or similar mode of storage to prevent scratching of the lenses, entanglement of the frame members in other items typically kept in pockets with the glasses, and storage. Because the case is a separate item from the glasses, the two are often separated, with the case being lost, rendering the glasses unprotected.

Accordingly, there is a continuing need for improvements in the folding eyewear art, whereby the folding eyewear incorporates a compact integrated case, which protects lenses while not in use, while promoting an attractive appearance while the folding eyewear are in use.

BRIEF SUMMARY OF THE INVENTION

As embodied herein and as claimed below, the present invention is generally directed to a collapsible eyewear apparatus that includes at least: a lens supported by a lens support member; a lens shield member providing a protective shield for an entirety of the lens against inadvertent contact with foreign objects; and an accent aperture formed by an accent aperture frame. Preferably, the lens shield member provides both the accent aperture frame, and an attachment portion, which preferentially engages the lens support member. The accent aperture is preferably offset from the attachment portion, and establishes a stylish aperture through a main body portion of the lens shield member.

In a preferred embodiment, the collapsible eyewear apparatus further includes: an earpiece confinement portion distal from the attachment portion, wherein the main body portion is disposed between the attachment portion and the earpiece confinement portion; and an earpiece member interacting with the earpiece confinement portion, wherein the accent aperture is configured to accommodate the earpiece member in a coplanar relationship with the aperture frame, and in which the central body portion is configured to occupy the accent aperture in a coplanar relationship with the aperture frame to form a continuous lens shield. In a preferred embodiment, the continuous lens shield provides a protective shield for the entire inner surface of the lens against inadvertent contact with foreign objects.

In an alternate preferred embodiment, the present invention is generally directed to a method for shielding an entirety of a lens of a collapsible eyewear apparatus by steps that include at least: disposing an earpiece within an accent aperture provided by a shield frame of a shield member to form a continuous shield; and folding the continuous shield adjacent the lens to protect the lens from inadvertent contact with foreign objects. In the alternate preferred embodiment, the earpiece features a restriction portion contactingly adjacent a confinement portion of the shield member, and wherein the earpiece is disposed within the accent aperture by steps that include at least: applying pressure against a proximal end of the earpiece; advancing the restriction portion into non-adjacency with the confinement portion; and sliding a central body portion of the earpiece into occupancy of the accent aperture, while maintaining a coplanar relationship between the central body portion of the earpiece and a shield frame.

These and various other features and advantages which characterize the claimed invention will be apparent from a reading of the following detailed description and a review of the associated drawings.

BRIEF DESCRIPTION OF THE SEVERAL DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiments are provided herein. It is to be understood, however, that the present invention may be embodied in various forms. Various aspects of the invention may be inverted, or changed in reference to specific part shape and detail, part location, or part composition, such as an inclusion of a partial or entire frame supporting the lenses, or a placement of a hinge for an ear piece inboard from an edge of the lens, rather than adjacent the edge of the lens. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
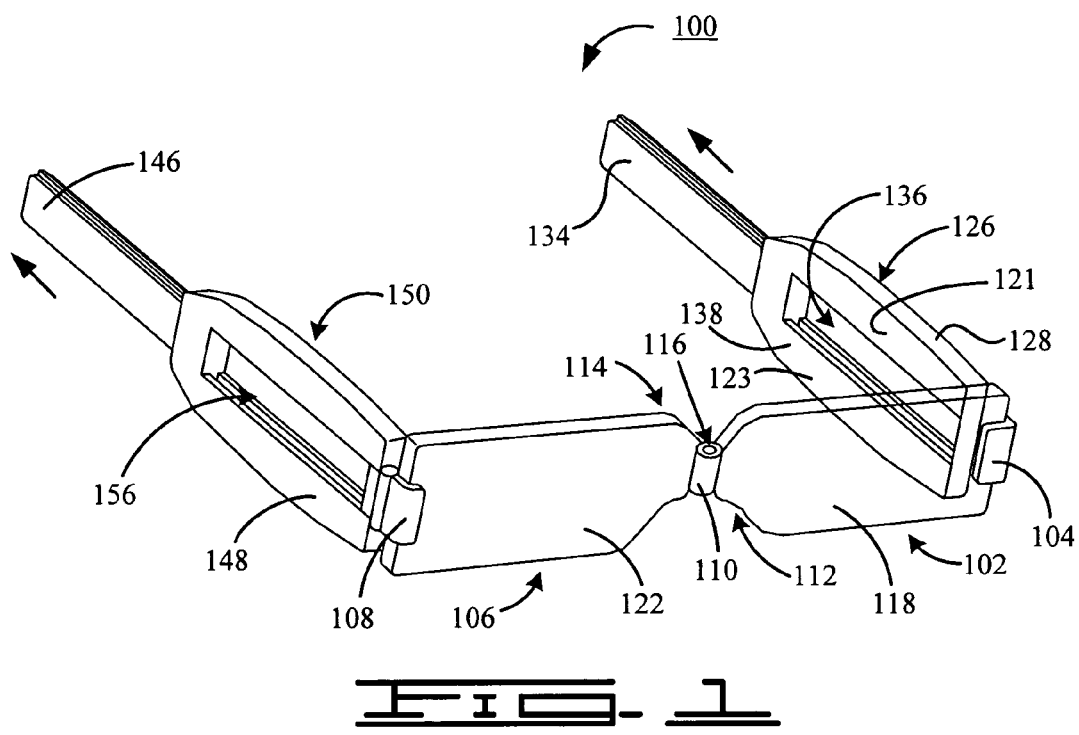
FIG. 1 is a perspective view of the invention in the fully extended position.

FIG. 1 shows collapsible eyewear 100 in a fully open and ready to use position. The collapsible eyewear 100 preferentially includes at least a first lens 102 supported by a first lens support member 104, and a second lens 106 supported by a second lens support member 108.

To facilitate folding of the first lens 102 into substantial adjacency with the second lens 106, the collapsible eyewear 100 preferably further includes: an articulating bridge member 110 interposed between a first bridge support portion 112 of the first lens 102; and a second bridge support portion 114 of the second lens 106. The inclusion of a hinge portion 116, provided by the articulating bridge member 110, provides the articulating function useful in folding of the first lens 102 into substantial adjacency with the second lens 106.

Figure 2:
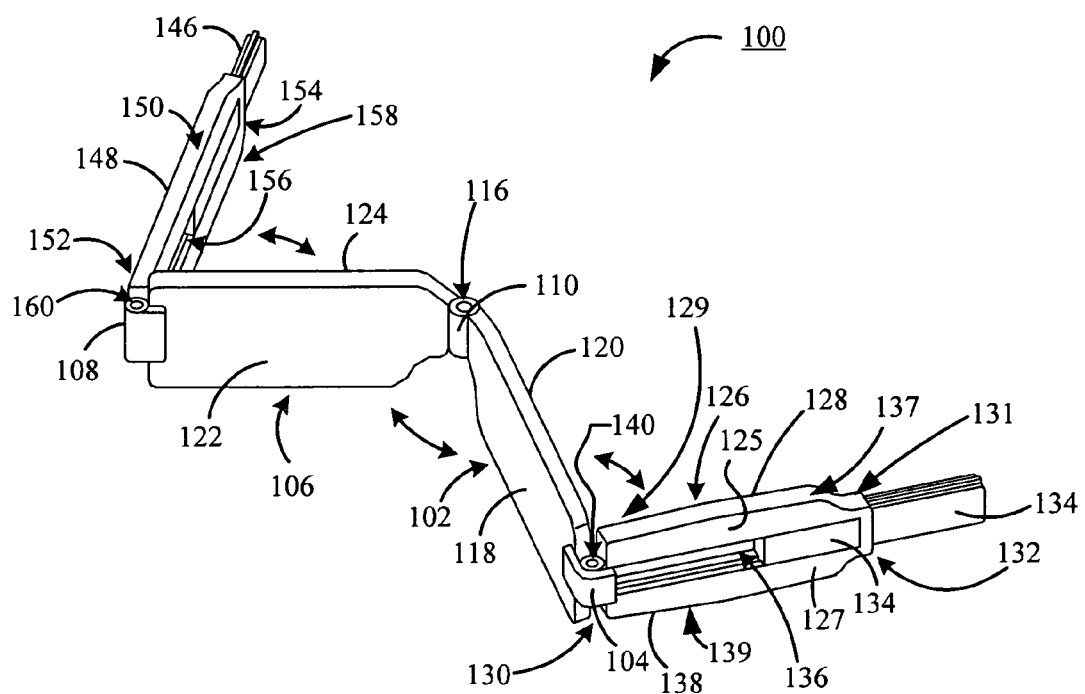
FIG. 2 is a perspective view of the invention in the process of unfolding.

As shown by FIG. 2, the first lens 102 provides an exterior lens surface 118 and an inner lens surface 120, while the second lens 106 provides an exterior lens surface 122 and an inner lens surface 124. In a preferred embodiment, the collapsible eyewear 100 preferably further includes: a first lens shield member 126 that provides a first accent aperture frame 128 disposed between a first attachment portion 130 on a proximal end; and a first earpiece confinement portion 132 on a distal end.

FIGS. 1 and 2 further shows, the first lens shield member 126 preferably provides an inner upper surface 121 disposed between a first end 129 and a second end 131, and an inner lower surface 123 disposed between the first end 129 and the second end 131. FIG. 2 further shows, the first lens shield member 126 preferably provides an outer upper surface 125 disposed between the first end 129 and the second end 131, and an outer lower surface 127 disposed between the first end 129 and the second end 131.

The first earpiece confinement portion 132 constrains a first earpiece 134 from becoming unintentionally disengaged from the first earpiece confinement portion 132 in a first direction. In a second direction, the first earpiece 134 is slidably mounted within the first accent aperture frame 128, allowing the first earpiece 134 to be drawn into, and entirely occupy, a first accent aperture 136. The first accent aperture 136 is positioned within the first accent aperture frame 128 and configured to provide passage through a main body portion 138 of the first lens shield member 126, while accommodating inclusion of the first earpiece 134 within the first accent aperture frame 128.

FIGS. 1 and 2, further show that the main body portion 138 includes, an upper main body portion 137 (interposed between the upper inner surface 121 and the upper outer surface 125), and an lower main body portion 139 (interposed between the lower inner surface 123 and the lower outer surface 127).

In a preferred embodiment, the attachment portion 130 of the first end 129 of the first lens shield member 126 is attached to the lens support member 104, the upper and lower inner surfaces 121,123, are interposed between the attachment portion 130 and the second end 131, and the upper and lower outer surfaces 125, 127, are interposed between the attachment portion 130 and the second end 131. FIGS. 1 and 2 further shows that the upper main body portion 137 is disposed between the upper inner surface 121 and the upper outer surface 125, while the lower main body portion 139 is disposed between the lower inner surface 123 and the lower outer surface 127.

The first accent aperture 136 is interposed between the attachment portion 104, the second end 131, the upper main body portion 137, and the lower main body portion 139. With this structure as a preferred embodiment, it is noted that the first accent aperture 136 provides access, or a passageway to the upper outer surface 125 from the lower inner surface 123, as well as a passageway to the upper inner surface 121 from the lower outer surface 127.

Continuing with FIG. 2, in a preferred embodiment, the collapsible eyewear 100 further includes: a first hinge feature 140 secured between the first attachment portion 130 of the first lens shield member 126; and the first lens support member 104. The first hinge feature 140 accommodates folding of the first lens shield member 126 into adjacency with the inner lens surface 120, and by sliding the first earpiece 134 into a coplanar position within the first accent aperture frame 128, a first continuous lens shield 142, shown by FIG. 3, is formed.

Figure 3:
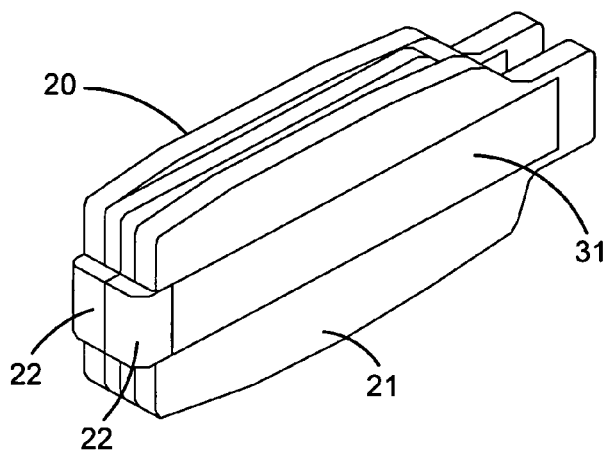
FIG. 3 is a perspective view of the invention in the fully closed position.

Turning now to FIG. 3, in a fully closed position: the inner lens surface 120 (not separately shown) of the first lens 102 is protected from inadvertent contact with foreign objects by the first continuous lens shield 142; the inner lens surface 124 (not separately shown) of the second lens 106 is protected from inadvertent contact with foreign objects by a second continuous lens shield 144; and the exterior lens surface 118 of the first lens 102 cooperates with the exterior lens surface 122 of the second lens 106 to protect against an inadvertent contact with foreign objects by either exterior lens surface 118 or 122.

Returning to FIG. 2, in a preferred embodiment, the second continuous lens shield 144, of FIG. 3, is formed by sliding a second earpiece 146 into a coplanar position within a second accent aperture frame 148 provided by a second lens shield member 150. The second accent aperture frame 148 is disposed between a second attachment portion 152 on a proximal end, and a second earpiece confinement portion 154 on a distal end.

The second earpiece confinement portion 154 constrains the second earpiece 146 from becoming unintentionally disengaged from the second earpiece confinement portion 154 in a first direction. In a second direction, the second earpiece 146 is slidably mounted within the second accent aperture frame 148, allowing the second earpiece 146 to be drawn into, and entirely occupy, a second accent aperture 156. The second accent aperture 156 is positioned within the second accent aperture frame 148 and configured to provide passage through a main body portion 158 of the second lens shield member 150, while accommodating inclusion of the second earpiece 146 within the second accent aperture frame 148.

In a preferred embodiment, the collapsible eyewear 100 further includes: a second hinge feature 160 secured between the second attachment portion 152 of the second lens shield member 150; and the second lens support member 108. The second hinge feature 160 accommodates folding of the second lens shield member 150 into adjacency with the inner lens surface 124, and with the second earpiece 146 slid into a coplanar position within the second accent aperture frame 148, the second continuous lens shield 144, shown by FIG. 3, is formed.

Figure 4:
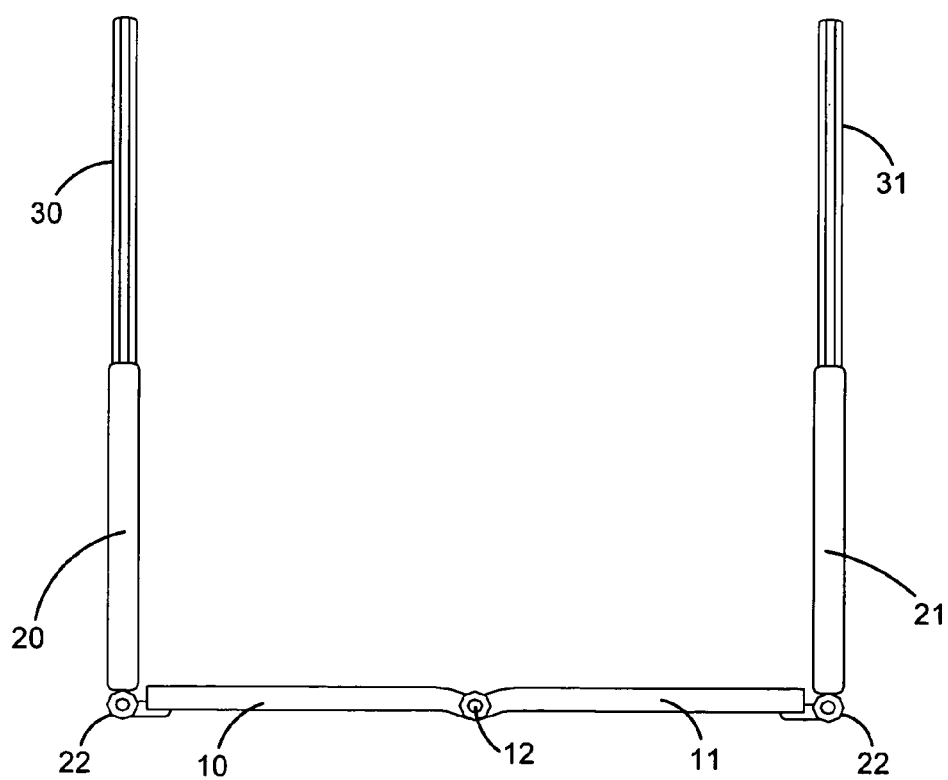
FIG. 4 is a top plan view of the invention in the fully extended position.

FIG. 4 shows, that the first earpiece 134 includes a tongue 162. The tongue 162 cooperates with a groove (not shown separately) of the first accent aperture frame 128 to assure the coplanar relationship established by sliding the first earpiece 134 into the first accent aperture frame 128 during formation of the first continuous lens shield 142, of FIG. 3, is maintained. FIG. 4 further shows, that the second earpiece 146 also includes a tongue 164, which cooperates with a groove (not shown separately) of the second accent aperture frame 148 to assure the coplanar relationship established during formation of the second continuous lens shield 144, of FIG. 3, is maintained between the second earpiece 146 and the second accent aperture frame 148.

Figure 5:
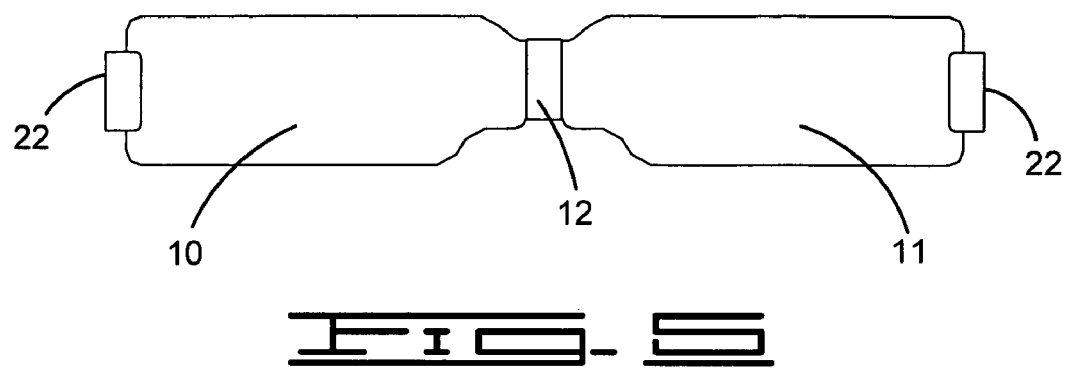
FIG. 5 is a front elevational view of an alternate embodiment of the invention in the fully extended position.
Figure 6:
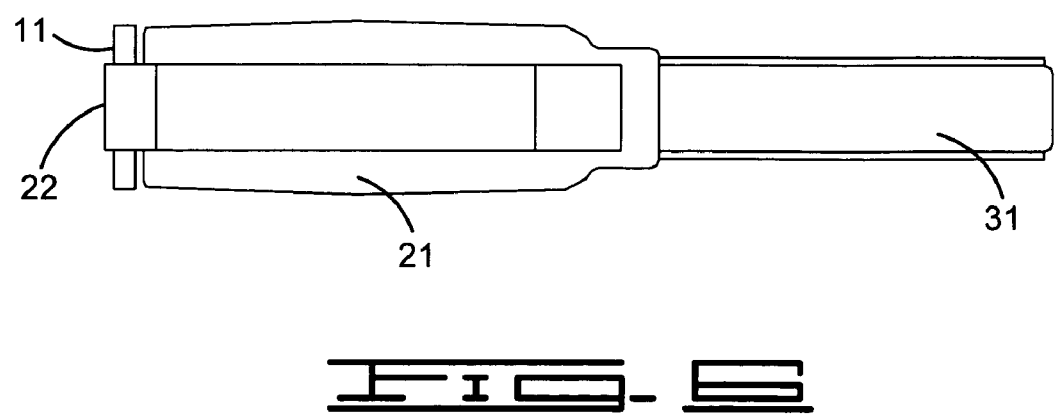
FIG. 6 is a side elevational view of the alternate embodiment of the invention of FIG. 5 in the fully extended position.

In contrast to FIG. 2, FIGS. 5 and 6 show an alternate embodiment of the collapsible eyewear 100. In the alternate embodiment shown by FIG. 5, both the first and second lens shield members 126 and 150 are obstructed from view by their corresponding lenses 102 and 106. FIG. 6 shows the relative position of the first accent aperture frame 128 to the inner lens surface 120, and the presence of a second tongue 166 provided by the first earpiece 134. The second tongue 166 cooperates with a second groove (not shown separately) of the first accent aperture frame 128, and cooperates with the tongue 162 and its corresponding groove to assure the coplanar relationship established during formation of the first continuous lens shield 142, of FIG. 3, is maintained between the first earpiece 134 and the first accent aperture frame 128.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A collapsible eyewear apparatus comprising:
    a lens supported by a lens support member; and
    a lens shield member comprising:
        a first end with an attachment portion attached to the lens support member;
        a second end distal from the first end;
        upper and lower inner surfaces interposed between said attachment portion and said second end;
        upper and lower outer surfaces interposed between said attachment portion and said second end;
        an upper main body portion interposed between said upper inner and upper outer surfaces;
        a lower main body portion interposed between said lower inner and lower outer surfaces; and
        an accent aperture interposed between said attachment portion, said second end, said upper main body portion, and said lower main body portion, wherein said accent aperture provides access to said upper outer surface from said lower inner surface, and to said upper inner surface from said lower outer surface.

2. The apparatus of claim 1, in which said attachment portion, said second end, said upper main body portion, and said lower main body portion form an aperture frame, and in which the lens shield member further comprising:
    an earpiece confinement portion distal from the attachment portion, wherein the upper main body portion and the lower main body portion are each disposed between the attachment portion and the earpiece confinement portion; and
    an earpiece member interacting with the earpiece confinement portion, wherein the accent aperture is configured to accommodate the earpiece member in a coplanar relationship with the aperture frame.

3. The apparatus of claim 2, in which the earpiece member comprises a restriction portion on a proximal end communicating with the confinement portion, a retention portion on distal end, and a central body portion disposed between the proximal and distal ends of the earpiece member.

4. The apparatus of claim 3, in which the restriction portion communicating with the confinement portion precludes an unintentional disengagement of the earpiece member from the lens shield member.

5. The apparatus of claim 4, in which the central body portion is configured to promote a sliding interface between the central body portion and the earpiece confinement portion.

6. The apparatus of claim 5, in which the central body portion is configured to occupy the accent aperture in a coplanar relationship with the aperture frame to form a continuous lens shield.

7. The apparatus of claim 6, in which the lens comprises an inner lens surface and an exterior lens surface with a lens body portion disposed there between.

8. The apparatus of claim 7, in which the continuous lens shield provides a protective shield for the inner surface of the lens against inadvertent contact with foreign objects.

9. The apparatus of claim 8, further comprising:
    a second lens with an inner lens surface and an outer lens surface supported by a second lens support member;
    a second lens shield member communicating with the second lens support member; and
    a second earpiece member interacting with the second lens shield member to form a second continuous lens shield.

10. The apparatus of claim 9, in which the lens and the second lens each provide a bridge support portion.

11. The apparatus of claim 10, further comprising a bridge member interposed between the bridge support portion of the lens and the bridge support portion of the second lens.

12. The apparatus of claim 11, in which the bridge member comprises a hinge portion for articulation of the lens relative to the second lens.

13. The apparatus of claim 12, in which the hinge portion facilitates a substantially non-contacting alignment between a substantially central point of the external lens surface of the lens, and a substantially central point of the exterior surface of the second lens.

14. The apparatus of claim 13, in which the hinge portion facilitates an alignment of the exterior lens surface of the lens with the exterior lens surface of the second lens, such that a line passing through the substantially central point of the exterior lens surface of the lens, and through the substantially central point of the exterior lens surface of the second lens is substantially simultaneously perpendicular to both the inner surface of the lens and the inner surface of the second lens.

15. A method for shielding an entirety of a lens of a collapsible eyewear apparatus by steps comprising:
    disposing an earpiece within an accent aperture provided by a shield frame of a shield member to form a continuous shield; and
    folding the continuous shield adjacent the lens to protect the lens from inadvertent contact with foreign objects, in which said shield member comprises: a first end with an attachment portion attached to the lens support member; a second end distal from the first end; upper and lower inner surfaces interposed between said attachment portion and said second end; upper and lower outer surfaces interposed between said attachment portion and said second end; an upper main body portion interposed between said upper inner and upper outer surfaces; a lower main body portion interposed between said lower inner and lower outer surfaces; and an accent aperture interposed between said attachment portion, said second end, said upper main body portion, and said lower main body portion, wherein said accent aperture provides access to said upper outer surface from said lower inner surface, and to said upper inner surface from said lower outer surface.

16. The method of claim 15, in which the earpiece comprises a restriction portion contactingly adjacent a confinement portion of the shield member, and wherein the earpiece is disposed within the accent aperture by steps comprising:
    applying pressure against a proximal end of the earpiece;
    advancing the restriction portion into non-adjacency with the confinement portion; and sliding a central body portion of the earpiece into occupancy of the accent aperture, while maintaining a coplanar relationship between the central body portion of the earpiece and a shield frame.

17. The method of claim 16, by steps further comprising: disposing a second earpiece within a second accent aperture provided by a second shield frame of a second shield member to form a second continuous shield; and folding the second continuous shield adjacent the second lens to protect the lens from inadvertent contact with foreign objects.

18. The method of claim 17, in which the lens and the second lens each comprise an exterior lens surface and an inner lens surface, wherein the continuous shield and the second continuous shield are each folded adjacent their corresponding inner lens surfaces, and further comprising a step of folding the exterior lens surface of the lens into adjacency with the exterior lens surface of the second lens, wherein a line passing through a substantially central point of the exterior lens surface of the lens, and through a substantially central point of the exterior lens surface of the second lens is substantially simultaneously perpendicular to both the inner surface of the lens and the inner surface of the second lens.

19. A collapsible eyewear combination comprising:
a lens with an inner lens surface and an outer lens surface supported by a lens support member;
a lens shield member communicating with the lens support member; and
an earpiece member interacting with the lens shield member, in which the lens shield member comprises: a first end with an attachment portion communicating with the lens support member; a second end distal from the first end; upper and lower inner surfaces interposed between said attachment portion and said second end; upper and lower outer surfaces interposed between said attachment portion and said second end; an upper main body portion interposed between said upper inner and upper outer surfaces, a lower main body portion interposed between said lower inner and lower outer surfaces; and an accent aperture interposed between said attachment portion, said second end, said upper main body portion, and said lower main body portion, wherein said accent aperture provides access to said upper outer surface from said lower inner surface, and to said upper inner surface from said lower outer surface, and further wherein the accent aperture is configured to accommodate the earpiece to facilitate formation of a continuous lens shield for an entirety of the lens by steps for forming a continuous lens shield.

20. The combination of claim 19, in which the steps for forming a continuous lens shield comprises:
disposing an earpiece within an accent aperture provided by a shield frame of a shield member to form a continuous shield; and
folding the continuous shield adjacent the lens to protect the entirety of the lens from inadvertent contact with foreign objects.

* * * * *